Dec. 1, 1936.          R. B. BRYANT          2,062,551
INTERNAL COMBUSTION ENGINE
Filed Jan. 21, 1933

INVENTOR.
Roy B. Bryant,
BY
ATTORNEYS.

Patented Dec. 1, 1936

2,062,551

UNITED STATES PATENT OFFICE 2,062,551

INTERNAL COMBUSTION ENGINE

Roy B. Bryant, Dallas, Tex.

Application January 21, 1933, Serial No. 652,892

8 Claims. (Cl. 123—143)

This invention relates to new and useful improvements in internal combustion engines.

One object of the invention is to provide an improved internal combustion engine firing under the heat of compression.

A particular object of the invention is to eliminate the building up of a high air pressure in the engine cylinder as is the usual practice in Diesel types of engines.

A further object of the invention is to provide a low compression engine and inject thereinto a pre-cooled highly compressed charge of air at or near the beginning of the power stroke, whereby premature firing and extremely high pressures at top of dead center are avoided.

A particular object of the invention is to provide a low compression engine having a fuel inlet for admitting a mixed charge and an ignition or firing chamber connected with the cylinder, together with means for admitting a charge of pre-cooled highly compressed air into the said chamber, whereby the lowly compressed fuel mixture therein is instantaneously fired.

A construction designed to carry out the invention will be hereinafter described, together with other features of the invention.

Figure 2:
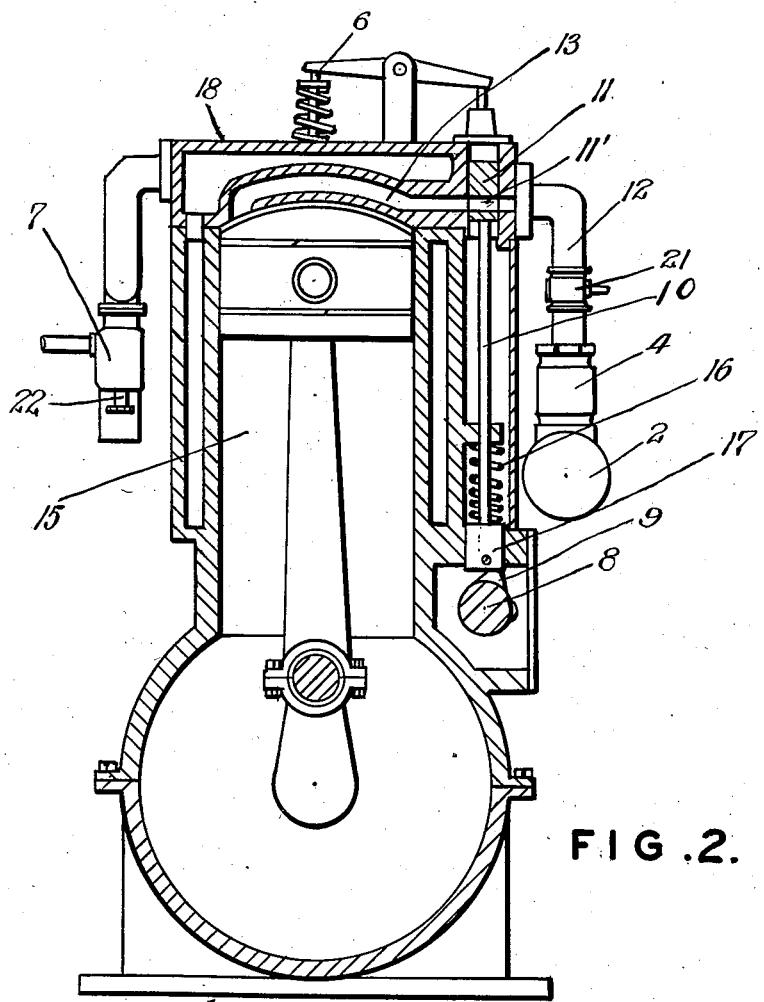
Figure 1:
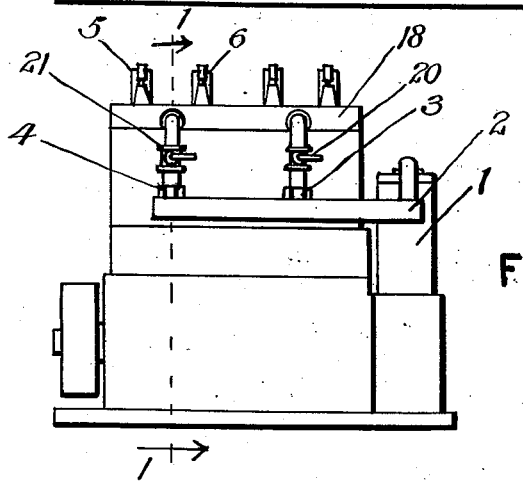

The invention will be more readily understood from a reading of the following specification and by reference to the accompanying drawing in which an example of the invention is shown, and wherein:

Figure 1 is a side elevation of an engine constructed in accordance with the invention, and Figure 2 is an enlarged transverse vertical sectional view of the same.

In the drawing the numeral 15 designates one of the cylinders of an internal combustion engine having a piston reciprocating therein. I have shown a two cylinder engine of the valve-in-head type, but it is to be clearly understood that the invention may be applied to any type of engine. The usual cylinder head 18 having inlet valves 5 and outlet valves 6, is secured on the cylinder block of the engine. A carburetor 7 having a needle valve 22 is connected to the usual manifold, which latter is mounted on one side of the head and has connection therewith, whereby fuel may be introduced into the head and cylinder from the carburetor. A pair of pipes 12, one for each cylinder of the engine, are mounted on the opposite side of the head and extend downwardly therefrom.

The lower ends of the pipes are connected to a tubular header 2 which extends longitudinally of the engine and along one side thereof. By observing Figure 1, it will be seen that the forward end of the header is connected to the lower end of the foremost pipe 12 which communicates with the number 1 cylinder of the engine, while the rear end of the header is connected with an air compressor 1. The other pipe is connected to the header intermediate its ends. It is desirable that the air from the compressor be cooled before entering the engine. Although the compressor is shown in the drawing mounted on and operated by the engine, it is to be clearly understood that the compressor may be entirely separate from said engine and may be operated by any suitable means.

The head 18 of the engine is provided with a pair of transverse passages 13, one for each cylinder. Each passage has its inner end open to the cylinder above the piston, and its outer end communicating with one of the pipes, 12. For opening and closing each passage, a vertically sliding valve 11 is mounted in the head near the outer end of said passage. The valve has a port 11' extending therethrough, so that, when the valve is in a raised position, the port registers with the passage to open the same (Figure 2). When the valve is in a lowered position, the port does not register with the passage and the same is closed. The valve is carried by an upright push rod 10, the lower end of which is secured to a tappet 17. A coiled spring 16 surrounds the lower end of the rod and exerts a downward pressure on the tappet to hold said tappet in contact with the usual cam shaft 8 which has a cam 9 thereon.

As the cam shaft is rotated, the cam will engage the tappet to lift the same, sliding the push rod and valve 11 upwardly to open the port 11', whereby the passage is opened and communication is established between the passage and the pipe 12. When the cam rides out of engagement with the tappet, the spring 16 will immediately force the tappet and rod and the valve attached thereto downwardly, thereby returning the valve to a lowered position to close the passage. With the above arrangement, the sliding valve is actuated by the cam 9 and the cam is so positioned on the shaft as to open the valve when the piston is near the completion of the compression stroke. The cam faces are so inclined as to quickly open and close the valve and said cam is of such size as to operate only during a minor portion of the crank travel, thus giving a snap action of limited duration. The size and shape of the cam may be varied so long as its function is performed.

Stop cocks or cut off valves 20 and 21 are connected in the pipes 12 and these cocks control the passage of air through the said pipes. Check valves 3 and 4 are connected in the pipes between the cocks and the header 2 and prevent back pressure from the cylinder 5 to enter the header. These valves, however, permit the free passage of air upwardly from the header into the pipes.

When it is desired to start the engine, the cocks 20 and 21 are closed and the engine is turned over by a starter or other suitable means. It is a known fact that low compression engines are more easily turned over than high compression engines, for the simple reason that there is no air under high pressure in the cylinder above the piston. The closing of the cocks prevents air from entering the cylinders from the header, and the only air which enters said cylinders is that drawn through the carburetor.

As the engine turns over, it will operate the air compressor 1, and since the air cannot escape from the header, a high pressure is built up in said header. While the pressure is being built up, the heat of compression is dissipated by any suitable means (not shown) such as a water jacket. By the time much pressure is built up by the continued turning over of the engine, sufficient fuel has been drawn from the carburetor into the cylinder. This fuel charge is forced upwardly into the passage from the cylinder by the piston and is thoroughly atomized. At this point, the cocks are opened and the valve 11 now controls the entrance of the pre-cooled built up air pressure from the header into the passage 13. With the parts in the position shown in Figure 2, the valve is in a raised position, the port 11 being in registration with the passage, and the passage is open. When this point is reached immediately after the cocks 20 and 21 have been opened, the air pressure which has been built up in the header and which has had the heat of compression dissipated therefrom will rush into the passage and will strike the atomized fuel charge, thus raising the pressure of said fuel charge within the passage and cylinders without mixing therewith prior to the ignition of the fuel charge. It is pointed out that the air pressure acts as a piston and raises the pressure of the entire fuel charge in the cylinder by forcing all of the charge out of the passage and back into the cylinder.

This increase in pressure will create sufficient heat to ignite the fuel charge. The resultant expansion caused by the ignition forces the piston downwardly and the engine then operates under its own power. It is again pointed out that the valve 11 is opened near the upper end of the compression stroke of the piston just about dead center to admit a charge of pre-cooled highly compressed air into the passage, whereby the atomized fuel charge in the cylinder is highly compressed, thereby igniting said charge. The valve 11 is opened only for a period sufficient to admit the charge of highly compressed air and to scavenge the passage and the cylinder and then is abruptly closed by the spring 16, due to the size and shape of the cam. Thus it is seen that the cam 9 opens the valve and the spring closes the same immediately after the cam has passed from under the tappet 17.

The opening and closing of the valve 11 is rapid in operation. When the valve is raised by the cam, the port is in registration with the passage.

As has been hereinbefore explained, as the cam passes from under the tappet the spring 16 lowers the valve to close the passage, therefore the port is in registration for only a short duration of time and the opening and closing of the valve is abrupt. As the valve 11 does not close in time to prevent the back pressure of the rapid expansion of fuel from entering the pipes 12, the check valves 3 and 4 will prevent such back pressure from expanding to the header and interfering with the operation of the air compressor 1. Thus, it will be seen that the air which is trapped between the check valves 3 and 4 and the exploded charge, will act as a cushion to take up the shock of the explosion in the passage, so that a denotation or knock will not be had in the engine.

The pre-cooled highly compressed air from the header is admitted into the passage 13 and the cylinder 15 only when it is desired to ignite the compressed atomized fuel charge. However, the valve 11 remains open a sufficient length of time so that the compressed air may cushion the explosion in the passage and then clear the burned gases out of the passage and carry them through the cylinder and out of the exhaust. It is pointed out that this scavenging of the passage with the pre-cooled compressed air will cool said passage, so that it will be at a lower temperature than the cylinder and the rest of the engine. Also, the large water jacket immediately above the passage will help to keep said passage cool. The engine is a low compression engine at all times and uses pre-cooled highly compressed air from an outside source to ignite the fuel charge.

The description which has been given recites more or less detail of a particular embodiment of the invention, which is set forth as new and useful; however, I desire it understood that the invention is not limited to such exact details of construction, because it is manifest that changes and modifications may be made, within the scope of the appended claims, without departing from the spirit of the invention.

What I claim and desire to secure by Letters Patent, is:

1. An internal combustion engine including, a cylinder provided with a cylinder head and having a piston working therein, means for introducing a fuel charge into the cylinder to be compressed by the piston, the cylinder head having an elongated passage having one end communicating with the interior of the cylinder so that a portion of the charge being compressed is forced into said passage, and means for supplying highly compressed air into said passage to further compress the fuel charge, whereby said charge is ignited, the passage preventing the admixture of the air with the fuel charge so that the highly compressed air which is supplied acts as a piston to obtain further compression of said charge.

2. An internal combustion engine including, a cylinder provided with a cylinder head and having a piston working therein, means for introducing a fuel charge into the cylinder to be compressed by the piston, the cylinder head having an elongated passage having one end communicating with the interior of the cylinder so that a portion of the charge being compressed is forced into said passage, means at the other end of said passage for closing the same, means for actuating said closing means in relation to the movement of the piston, and means for introducing compressed air into the passage just before the piston reaches the top of its stroke, whereby said air further compresses the fuel charge to ignite the same, and means for automatically closing the passage to trap a portion of the air therein at the ignition of the charge whereby said trapped air acts as a cushion upon explosion of said charge.

3. An internal combustion engine including, a cylinder provided with a cylinder head and having a piston working therein, means for introducing a fuel charge into the cylinder to be compressed by the piston, the cylinder head having an elongated passage in the top of the cylinder having one end communicating with the interior thereof so that a portion of the charge being compressed is forced into said passage upon the upstroke of the piston, means for introducing compressed air into said passage to further compress the fuel charge whereby said charge is ignited, and means located at the other end of the passage for controlling the admittance of said compressed air to the passage.

4. An internal combustion engine including, a cylinder provided with a cylinder head and having a piston working therein, means for introducing a fuel charge into the cylinder to be compressed by the piston, the cylinder head having an elongated passage extending diametrically in the top of the cylinder having one end communicating with the interior thereof so that a portion of the charge being compressed is forced into said passage upon the upstroke of the piston, means for introducing compressed air into said passage to further compress the fuel charge whereby said charge is ignited, a valve located at the opposite end of said passage for controlling the admittance of air into the passage, and means for actuating said valve in direct relation to the movement of the piston, whereby the valve is opened to admit air to the passage just before the ignition point of the fuel charge and said valve is closed upon explosion of the charge to trap a portion of said air within the passage.

5. An internal combustion engine including, a cylinder provided with a cylinder head and having a piston working therein, means for introducing a fuel charge into the cylinder to be compressed by the piston, a compressor for building up an air pressure outside the cylinder, the cylinder head having an elongated passage having one end communicating with the interior of the cylinder so that a portion of the compressed fuel charge is forced thereinto, means for connecting the air compressor with the other end of the passage whereby the compressed air is introduced into said passage to further compress the fuel charge, to ignite the same, and means at the end of the passage to which the compressor connecting means is attached for controlling the admittance of air to the passage and to prevent back pressure from the cylinder caused by the ignition of the fuel charge from entering the compressor.

6. An internal combustion engine including, a cylinder provided with a cylinder head and having a piston working therein, means for introducing a fuel charge into the cylinder to be compressed by said piston, a compressor for building up an air pressure outside the cylinder, the cylinder head having an elongated passage extending across the top of the cylinder and having one end communicating with the interior thereof so that a portion of the fuel charge being compressed is forced into said passage upon the upstroke of the piston, means for connecting the air compressor with the other end of the passage whereby the compressed air is introduced into said passage to further compress the fuel charge, to ignite the same, and means at the end of the passage to which the compressor connecting means is attached for controlling the admittance of air to the passage and to prevent back pressure from the cylinder caused by the ignition of the fuel charge from entering the compressor.

7. An internal combustion engine including, a cylinder provided with a cylinder head and having a piston working therein, means for introducing a fuel charge into the cylinder to be compressed by the piston, a compressor for building up an air pressure outside the cylinder, the cylinder head having an elongated passage having one end communicating with the interior of the cylinder so that a portion of the compressed fuel charge is forced thereinto, means for connecting the air compressor with the other end of the passage whereby the compressed air is introduced into said passage to further compress the fuel charge to ignite the same, a valve at the end of the passage to which the compressor is connected, and means for actuating said valve in direct relation to the movement of the piston, whereby the valve is opened to admit air to the passage just prior to the ignition point of the fuel charge and said valve is closed upon explosion of the charge to trap a portion of said air within the passage and to prevent the back pressure from the cylinder entering the compressor.

8. An internal combustion engine including, a cylinder provided with a cylinder head and having a piston working therein, means for introducing a fuel charge into the cylinder to be compressed by said piston, a compressor for building up an air pressure outside the cylinder, the cylinder head having an elongated passage extending across the top of the cylinder and having one end communicating with the interior thereof so that a portion of the fuel charge being compressed is forced into said passage, upon the upstroke of the piston, means for connecting the air compressor with the other end of the passage whereby the compressed air is introduced into said passage to further compress the fuel charge to ignite the same, a valve at the end of the passage to which the compressor is connected, and means for actuating said valve in direct relation to the movement of the piston, whereby the valve is opened to admit air to the passage just prior to the ignition point of the fuel charge and said valve is closed upon explosion of the charge to trap a portion of said air within the passage and to prevent the back pressure from the cylinder entering the compressor.

ROY B. BRYANT.